(12) United States Patent
Brendel et al.

(10) Patent No.: US 9,995,335 B2
(45) Date of Patent: Jun. 12, 2018

(54) COUPLING ELEMENT FOR A MULTI-JOINT CRANK DRIVE AND MULTI-JOINT CRANK DRIVE

(71) Applicant: AUDI AG, Ingolstadt (DE)

(72) Inventors: Matthias Brendel, Ingolstadt (DE); Markus Wild, Stammham (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/106,022

(22) PCT Filed: Dec. 19, 2014

(86) PCT No.: PCT/EP2014/003437
§ 371 (c)(1),
(2) Date: Jun. 17, 2016

(87) PCT Pub. No.: WO2015/090605
PCT Pub. Date: Jun. 25, 2015

(65) Prior Publication Data
US 2016/0319858 A1 Nov. 3, 2016

(30) Foreign Application Priority Data

Dec. 20, 2013 (DE) .......................... 10 2013 021 980

(51) Int. Cl.
*F16C 7/00* (2006.01)
*F02B 75/32* (2006.01)
(Continued)

(52) U.S. Cl.
CPC ............ *F16C 7/023* (2013.01); *F02B 75/045* (2013.01); *F02B 75/32* (2013.01)

(58) Field of Classification Search
CPC .......... F16C 7/023; F16C 3/06; F02B 75/045; F02B 75/32; F02B 75/048; F02B 75/06;
(Continued)

(56) References Cited

U.S. PATENT DOCUMENTS 7,219,641 B2 *  5/2007  Weinkauf .............. F02F 3/0023
                                                        123/193.6
7,290,507 B2 * 11/2007  Mizuno ................. F02B 75/048
                                                        123/197.1
(Continued)

FOREIGN PATENT DOCUMENTS

DE       101 31 322 A1    1/2003
DE       1 914 402 A2     4/2008
(Continued)

OTHER PUBLICATIONS

Machine translation of DE 102010052004 A1 obtained on Apr. 25, 2017.*

(Continued)

*Primary Examiner* — Adam D Rogers
(74) *Attorney, Agent, or Firm* — Henry M Feiereisen LLC

(57) ABSTRACT

A coupling element for a multi-joint crank drive of an internal combustion engine includes a coupling lever having a first eye for a piston connecting rod, and a second eye for an articulation connecting rod. A bearing cover forms with the coupling lever a third eye for a crank pin. The coupling lever and the bearing cover are connected to each other by bolts which defined parallel longitudinal central axes. The coupling lever and the bearing cover abut each other at an outer periphery of the third eye at adjacent contact surfaces on both sides of the third eye to define a separating plane which extends through a center of the third eye at an acute angle with respect to a further plane which passes through the center of the third eye and extends perpendicular to the longitudinal central axes of the bolts.

16 Claims, 3 Drawing Sheets

(51) Int. Cl.
*F02B 75/04* (2006.01)
*F16C 7/02* (2006.01)

(58) Field of Classification Search
CPC ......... F02B 67/00; F01L 1/344; F16F 15/264; F16F 15/265
See application file for complete search history.

(56) References Cited

U.S. PATENT DOCUMENTS

| | | | | |
|---|---|---|---|---|
| 7,290,508 | B2 * | 11/2007 | Mizuno | F02B 75/048 |
| | | | | 123/197.1 |
| 7,357,104 | B2 * | 4/2008 | Kobayashi | F02B 75/048 |
| | | | | 123/197.4 |
| 7,392,781 | B2 * | 7/2008 | Takahashi | F02B 75/32 |
| | | | | 123/197.4 |
| 7,661,395 | B2 * | 2/2010 | Watanabe | F02B 75/048 |
| | | | | 123/48 B |
| 8,127,739 | B2 * | 3/2012 | Kono | F02B 41/04 |
| | | | | 123/197.1 |
| 8,136,501 | B2 * | 3/2012 | Kono | F02B 75/045 |
| | | | | 123/197.1 |
| 8,978,616 | B2 | 3/2015 | Brendel | |
| 2002/0026910 | A1 | 3/2002 | Hiyoshi et al. | |
| 2002/0144665 | A1 | 10/2002 | Ushijima et al. | |
| 2012/0285412 | A1 | 11/2012 | Brendel et al. | |
| 2014/0137825 | A1 * | 5/2014 | Brendel | F16F 15/264 |
| | | | | 123/90.17 |
| 2017/0058765 | A1 * | 3/2017 | Brendel | F02B 75/045 |

FOREIGN PATENT DOCUMENTS

| | | | | |
|---|---|---|---|---|
| DE | 102010004578 A1 * | 7/2011 | | F02D 15/02 |
| DE | 10 2010 052 004 A1 | 5/2012 | | |
| DE | 10 2011 116 609 A1 | 4/2013 | | |
| DE | 102014018898 A1 * | 6/2016 | | F02B 75/045 |
| EP | 1 180 588 A2 | 2/2002 | | |
| EP | 1 247 960 A1 | 10/2002 | | |
| EP | 1 431 617 A | 6/2004 | | |
| EP | 1 914 405 A2 | 4/2008 | | |
| JP | 2004-044776 | 2/2004 | | |
| JP | 2004 124775 | 4/2004 | | |
| JP | 2004-124776 | 4/2004 | | |
| JP | 2008-138607 | 6/2008 | | |
| JP | 2009-215970 | 9/2009 | | |
| JP | 2013-417407 | 5/2013 | | |
| JP | 2013-517407 | 5/2013 | | |
| WO | WO 2012/175177 | 12/2012 | | |

OTHER PUBLICATIONS

Machine translation of JP 2004-124775 A obtained on Apr. 25, 2017.*

International Search Report issued by the European Patent Office in international Application PCT/EP2014/003437.

* cited by examiner

COUPLING ELEMENT FOR A MULTI-JOINT CRANK DRIVE AND MULTI-JOINT CRANK DRIVE

CROSS-REFERENCES TO RELATED APPLICATIONS

This application is the U.S. National Stage of International Application No. PCT/EP2014/003437, filed Dec. 19, 2014, which designated the United States and has been published as International Publication No. WO 2015/090605 and which claims the priority of German Patent Application, Serial No. 102013021980.9, filed Dec. 20, 2013, pursuant to 35 U.S.C. 119(a)-(d).

BACKGROUND OF THE INVENTION

The invention relates to a coupling element of a mufti-joint crank drive of an internal combustion engine, including a coupling lever and a bearing cover, wherein the coupling lever surrounds a first eye for a piston connecting rod of the crank drive, a second eye for an articulation connecting rod of the crank drive and together with the bearing cover a third eye for a crank pin of a crankshaft, wherein the coupling lever and the bearing cover abut one another on the outer periphery of the third eye in a separating plane passing through the center of the third eye and are bolted to each other by two bolts, and wherein the two bolts have parallel longitudinal central axes. The invention further relates to a multi-joint crank drive of an internal combustion engine with a plurality of such coupling elements.

Coupling elements of the type mentioned above are used in multi-joint crank drives of internal combustion engines as connecting members between the piston connecting rods connected to the pistons, the corresponding crank pins of the crankshaft, and associated articulation connecting rods connected to an eccentric shaft. The working stroke of the piston of the internal combustion engine can be adjusted by means of the multi-joint crank drive so that different working strokes of the piston result in different working cycles of the internal combustion engine. The working stroke is hereby understood to be the distance which lies between an upper and a lower dead point of the piston, i.e. the maximum distance traveled by the piston during the working stroke. Alternatively or additionally, the compression ratio can be set by the multi-joint crank drive, which is realized in the cylinder associated to the piston, in particular depending on the operating point of the internal combustion engine and/or the working stroke of the cylinder.

A coupling element and a multi-joint crank drive are already known from DE 10 2011 116 609 A1 of the applicant. The known coupling element has a split third eye and includes a coupling lever and a bearing cover connected to the coupling lever by two bolts, each forming one half of the third eye. The coupling lever and the bearing cover abut each other on the outer circumference of the third eye along two lines of contact, which span a separating plane passing through the center of the split third eye. In order to provide high strength with low mass, the coupling lever and the bearing cover are connected together by two bolts defining longitudinal central axes which are not parallel to each other but are aligned "skew".

The publications EP 1 247 960 A2, EP 1 914 405 A2, and JP 2004-124775 A are also known in the art.

It has been shown that multi-joint crank drives with coupling elements, in which the coupling lever and the bearing cover are connected to one another by such "skewed" bolts, cannot be realized on a large scale with the necessary bolt tightening and monitoring procedures.

Therefore, solutions are sought with which a high strength can be achieved for coupling elements whose bolts have parallel longitudinal central axes, despite low coupling element mass. This poses difficulties especially when the distance between the third eye and the first eye should be kept as small as possible and therefore the screw hole for the bolt arranged on the side of the first eye shall no longer pass through between the first and third eyes as in the coupling element from DE 10 2011 116 609 A1.

SUMMARY OF THE INVENTION

Against this background, the invention is based on the object to improve a coupling element and a multi-joint crank drive of the aforementioned type in such a way that high strength can be achieved without "skewed" bolts between the coupling lever and the bearing cover with low mass of the coupling element.

This is achieved according to the invention in that the separating plane is inclined at an acute angle with respect to a plane passing through the center of the eye and perpendicular to the longitudinal central axes of the two bolts, wherein on the outer periphery of the third eye, immediately adjacent paired facing contact surfaces of the coupling lever and the bearing cover on both sides of the third eye are perpendicular to the longitudinal central axes of the two bolts. This also means that the longitudinal central axes of both bolts are not perpendicular to the separating plane.

When the separating plane is inclined on the side of the first eye in a direction away from the first eye, as a result of the feature according to the invention, the coupling lever on the side of the first eye can be strengthened by a few millimeters around the screw hole, and thus the screw hole can be deepened or lengthened by several millimeters. As a result, there is no need to guide the screw hole on the side of the first eye between the first and third eyes like in the coupling element from DE 10 2011 116 609 A1, but "beneath" the first eye, i.e. between the latter and the bearing cover. Therefore, the distance between the first eye and the third eye can be kept very small, resulting in a reduction in mass of the coupling element.

Furthermore, according to a preferred configuration of the invention, a lift arm of the coupling element penetrated by the first eye can be configured as a fork arm unlike the coupling element from DE 10 2011 116 609 A1. Through the design of the coupling element with double-sided fork arm, i.e. both on the side of the lift arm with the first eye and on the side of the coupling arm with the second eye, it is achieved that the high complexity and the accompanying high processing costs are incurred only with respect to one component, namely the coupling lever, while the other components, namely the piston connecting rod connected to the first eye with the lift arm and the articulation connecting rod connected to the second eye with the coupling arm, can be configured simpler.

In a lift arm configured as a fork arm, the screw hole of the coupling lever can be configured on the side of the first eye suitably as a through-bore which opens between two limbs of the fork arm and receives one of the two bolts. This bolt on the side of the first eye is hereinafter referred to as first bolt, while the bolt on the side of the second eye is hereinafter referred to as a second bolt.

In order to facilitate joining of the coupling lever and bearing cover, when mounting the coupling element, despite the inclination of the separating plane relative to the plane perpendicular to the longitudinal central axes of both bolts through the center of the third eye, the coupling lever and the bearing cover have facing contact surfaces immediately adjacent at its outer circumference on both sides of the third eye, which, according to another preferred embodiment of the invention, extend perpendicular to the longitudinal central axes of the two bolts.

Like in the coupling element from DE 10 2011 116 609 A1, the two bolts are advantageously dimensioned differently, wherein they not only have different diameters but also considerably different lengths. The first bolt is hereby suitably thin and advantageously also significantly shorter than the second bolt. Both bolts are advantageously anti-fatigue bolts, which can also absorb bending stresses.

Like in the coupling element from DE 10 2011 116 609 A1, the coupling lever and the bearing cover lie form-fittingly against each other on both sides of the circumference of the third eye, and are provided there with complementary interlocking toothed surfaces. The toothed surface of the coupling lever and the bearing cover on the side of the first eye or around the first bolt is referred to as first toothed surface, while the toothed surface on the side of the second eye or around the second bolt is referred to as the second toothed surface.

The two complementary toothed surfaces extend each along a dividing plane which is defined by the tips of the teeth of the toothed surface of the coupling lever. Like in the coupling element from DE 10 2011 116 609 A1, the dividing plane intersect and form an angle not equal to 180 degrees. The dividing plane of the first toothed surface of the coupling lever is hereinafter referred to as first dividing plane, while the dividing plane of the second toothed surface of the coupling lever is hereinafter referred to as second dividing plane.

Unlike the coupling element from DE 10 2011 116 609 A1, the dividing planes of the two toothed surfaces to the left and right of the third eye enclose differently sized angles also with the plane passing through the center of the eye and perpendicular to the longitudinal central axes of the two bolts, so that they do not intersect in a plane perpendicular to this plane through the center of the third eye. Instead, the first and second dividing planes intersect closer at the second bolt.

In this way, the last tooth of the second toothed surface can be further shifted away downwards from an upper side of the coupling lever on the end of the second toothing facing away from the third eye and as a result the height of the bending cross-section and thus the flexural strength of the coupling lever can be increased in this area. This is especially of advantage, because the height of the bending cross-section is reduced on the side of the second eye in favor of a higher cross-section on the side of the first eye, when the dividing plane for extending the screw hole of the first bolt has been inclined with respect to the plane perpendicular to the longitudinal central axes of both bolts through the center of the third eye, as previously described.

Advantageously, a first angle between the dividing plane of the first toothed surface and the plane perpendicular to the longitudinal central axes of the two bolts through the center of the third eye is smaller than a second angle between this plane and the dividing plane of the second toothed surface, wherein the first angle is advantageously about 15 degrees and the second angle is suitably about 20 degrees. In this way, a good compromise can be achieved between a sufficient height of the bending cross-section on the side of the second eye on one hand, and a sufficient length of the screw hole on the side of the first eye on the other hand.

While the first dividing plane passes advantageously approximately through the center of the third eye, the second dividing plane advantageously has a lateral offset with respect to the center of the third eye and passes suitably through the first eye, advantageously approximately through its center.

Like in the coupling element from DE 10 2011 116 609 A1, the teeth of the first and second toothed surfaces have tooth flanks with different angular dispositions with respect to each dividing plane in order to increase the contact surfaces along the two toothed surfaces and ensure the ability to assemble.

BRIEF DESCRIPTION OF THE DRAWING

The invention is explained in more detail with reference to an exemplary embodiment shown in the drawings, without limiting the invention. It is shown in.

DETAILED DESCRIPTION OF PREFERRED EMBODIMENTS

Figure 1:
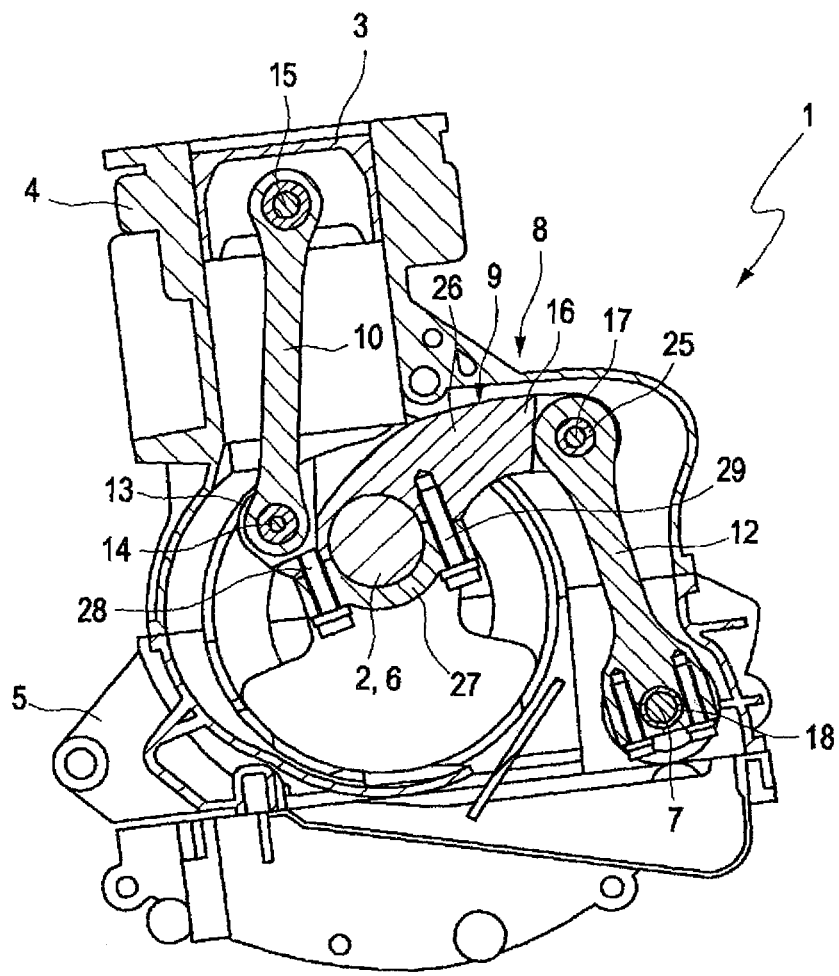
FIG. 1 a schematic sectional view of parts of an internal combustion engine with a multi-joint crank drive.

The internal combustion engine 1 shown in FIG. 1 involves an in-line multi-cylinder combustion engine, more exactly a four-stroke four-cylinder in-line multi-cylinder combustion engine. The internal combustion engine 1 has a crankshaft 2 and four pistons 3 (only one shown), that are each movable back and forth in a cylinder 4. The crankshaft 2 is rotatably mounted in shaft bearings (not shown) of a cylinder crankcase 5 and includes five centered shaft pins (not visible) for support and four stroke or crank pins 6 (only one is shown), whose longitudinal central axes pass through in different angular orientations parallel to the axis of rotation of the crankshaft 2 and are arranged in different angular orientations in relation to this axis of rotation. The internal combustion engine 1 further includes an eccentric shaft 7 with an axis of rotation parallel to the axis of rotation of the crankshaft 2, which is rotatably mounted next to and somewhat below the crankshaft 2 in the cylinder crankcase 5, and a multi-joint crank drive 8 with four coupling elements 9, which are each rotatably mounted on one of the crank pins 6 of the crankshaft 2, wherein they are connected on one side of the crankshaft 2 by a piston connecting rod 10 to one of the pistons 3 and on the other side of the crankshaft 2 by an articulation connecting rod 12 to the eccentric shaft 7.

Each coupling element 9 includes a shorter lift arm 13 which is pivotally connected via a pivot joint 14 to a lower end of one of the piston connecting rods 10. An upper end of each piston connecting rod 10 is hinged via a further swivel joint 15 on the associated piston 3. Overall, each of the four pistons 3 is thus connected to the crank shaft 2 by the respective piston connecting rod 10 and the respective coupling element 9.

Further, each coupling element 9 includes a longer coupling arm 16, which is pivotally connected via a pivot joint 17 to an upper end of one of the articulation connecting rod 12. A lower end of the respective articulation connecting rod 12 is hinged via a further pivot joint 18 on the eccentric shaft 7.

The articulation connecting rods 12 are oriented approximately parallel to the piston connecting rods 10 and are arranged in the axial direction of the crankshaft 2 and the eccentric shaft 7 each in approximately the same plane as the associated piston connecting rod 10.

The compression ratio of the internal combustion engine 1 can be varied by means of the multi-joint crank drive 8 and the inclination of the piston connecting rod 10 with respect to the cylinder axis of the associated cylinder 4 can be reduced during the rotation of the crankshaft 2, leading to a reduction of the piston side forces and thus of the frictional forces between the piston 3 and cylinder walls the cylinder 4.

Figure 2:
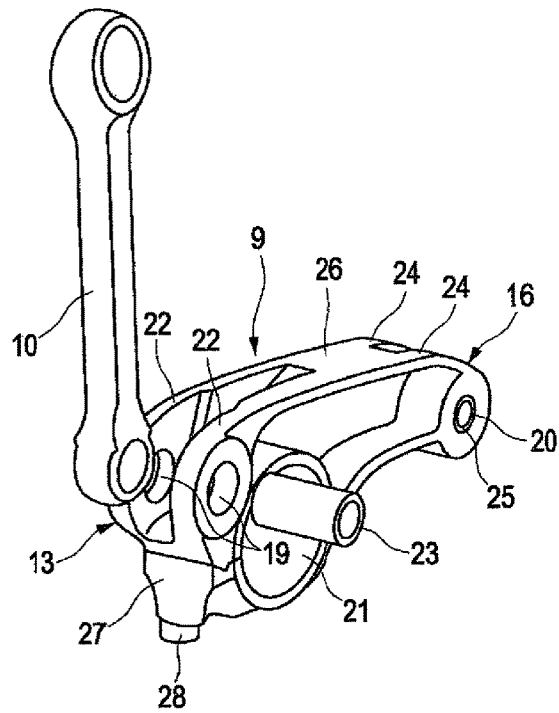
FIG. 2 a perspective view of a coupling element and a piston connecting rod of the multi-joint crank drive.
Figure 3:
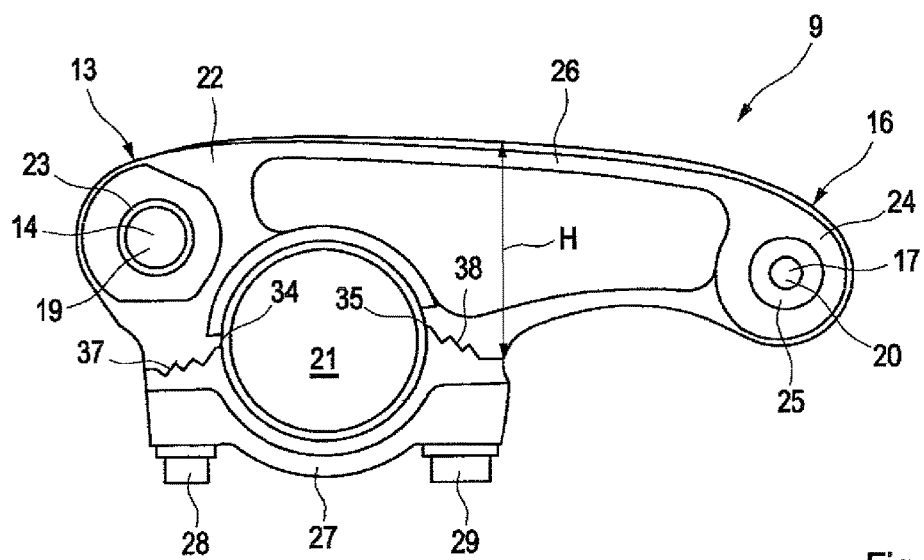
FIG. 3 a side view of the coupling element with a coupling lever and a cover part.
Figure 4:
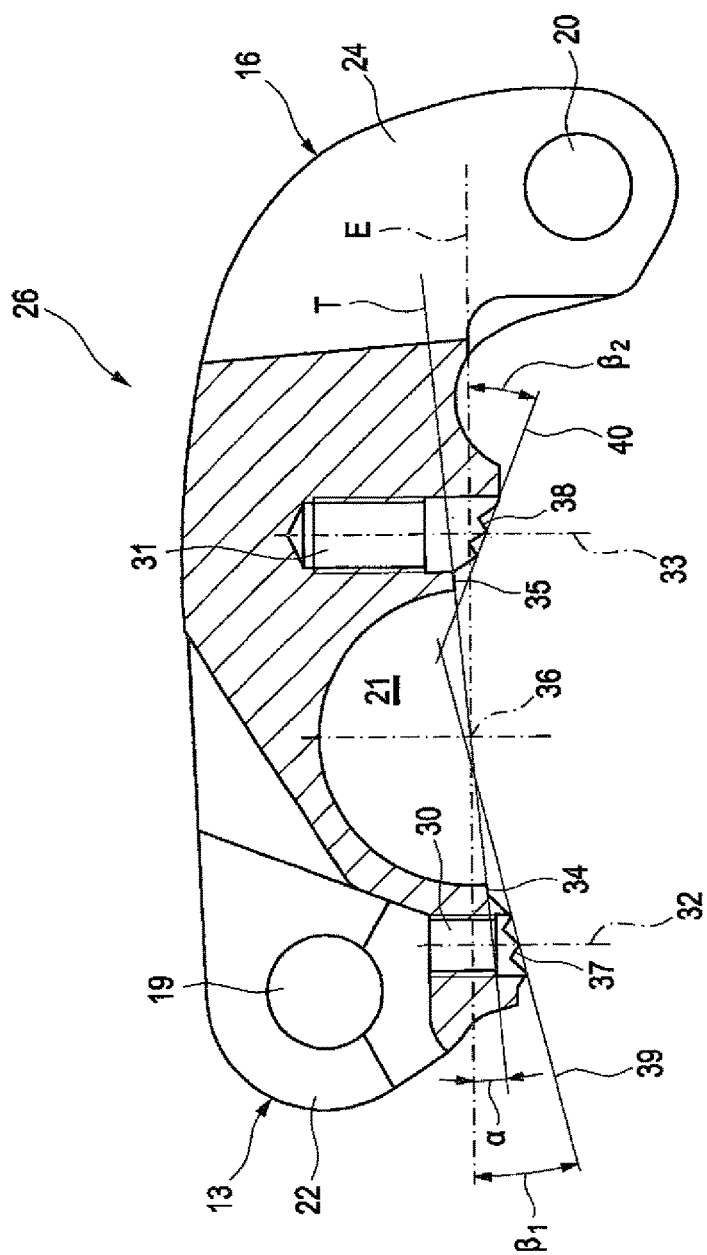
FIG. 4 a partially sectioned side view of the coupling lever.

As best illustrated in FIGS. 2, 3 and 4, each coupling element 9 has a first eye 19, a second eye 20, and a third eye 21. The first eye 19 extends through two fork limbs 22 of the lift arm 13 and forms, together with an associated bearing pin 23, the pivot joint 14 for the lower end of piston connecting rod 10. The second eye 20 extends through two fork limbs 24 of the coupling arm 16 and forms, together with an associated bearing pin 25, the pivot joint 17 for the upper end of the articulation connecting rod 12. The third eye 21 is arranged between the first and the second eyes 19 and 20, has a larger diameter, and is used for receiving a crank pin 6.

In a lift arm configured as a fork arm, the screw hole of the coupling lever can be In order to enable the coupling element 9 to be attached to the crank pin 6, the third eye 21 is a split eye. For this purpose, the coupling element 9 includes a coupling lever 26 and a bearing cover 27, which are connected firmly to each other by two bolts 28, 29 on both sides of the eye 21. As best illustrated in FIG. 4, the two bolts 28, 29 as well as the corresponding internally threaded or screw holes 30, 31 have parallel longitudinal central axes 32, 33 in the coupling lever 12 and through-bores (not visible) in the bearing cover 27.

The first bolt 28 on the side of the first eye 19 involves a short M9 bolt while the second bolt 29 on the side of the second eye 20 involves a longer M11 bolt. Both bolts 28, 29 are configured as anti-fatigue bolts so that they can withstand bending loads better.

The coupling lever 26 and the bearing cover 27 each extend 180 degrees around the outer periphery of the eye 21 and have two pairs of contact surfaces 34, 35 facing each other around the outer circumference of the eye 21. The inner ends of the contact surfaces 34, 35 immediately adjacent to the outer periphery of the eye 21 span a separating plane T, which passes through the center 36 of the eye 21 and through the central axis of the crank pin 6 mounted in the eye 21.

As best illustrated in FIG. 4, the separating plane T is inclined with respect to a plane E perpendicular to the longitudinal central axes 32, 33 of the bolts 28, 29 through the center 36 of the third eye 21 at an acute angle α of about 5 degrees. Thus, the longitudinal central axes 32, 33 of the bolts 28, 29 are also not aligned perpendicularly to the separating plane T. The direction of the inclination of the separating plane T is selected so that it has a greater distance than the plane E from the center of the first eye 19 on the side of the first eye 19. As a result, the lift arm 13 underneath the first eye 19 can be made thicker and thus the length of the screw hole can be enlarged such that, unlike in the coupling element from DE 10 2011 116 609 A1, it no longer needs to routed between the first and third eyes 19 and 21 but may be arranged completely below the first eye 19.

As a result, it is also possible, unlike in the coupling element from DE 10 2011 116 609 A1, to form not only the coupling arm 16 but also the lift arm 13 as a fork arm with two fork limbs 24 and 22. Thus, the mass of the coupling element 9 is reduced and the piston connecting rod 10 can be designed in the area of the pivot joint 14 without fork, thereby being able to reduce on one hand the mass of the piston connecting rods 10 and thus mass that has to be moved up and down in the cylinder, and to simplify on the other hand the construction of the piston connecting rods 10 and thus production costs. The pivot bearing 14 does not require a pressure oil supply since the returning cooling oil from the piston 3 downwards into the cylinder crankcase 5 provides sufficient lubrication here.

As can be seen from FIG. 4, the screw hole 30 can additionally be configured as a through-bore which opens into the intermediate space between the two fork limbs 22 of the lift arm 13.

A comparison with the coupling element from DE 10 2011 116 609 A1 further shows that the center distance of the two eyes 19, 21 can be reduced, which allows a further reduction in the mass of the coupling element 9 and improves the design possibilities of the total crank drive kinematics.

The coupling lever 26 and the bearing cover 27 lie form-fittingly against each other on both sides of the eye 21. For this purpose, the coupling lever 26 is provided with a first toothed surface 37 around the mouth of the screw hole 30 of the first bolt 28 and with a second toothed surface 38 around the mouth of the screw hole 31 of the second bolt 29. After assembly of the coupling element 10, the first and second toothed surfaces 37, 38 engage form-fittingly facing complementary first and second toothed surfaces 37, 38 of the bearing cover 27, as best shown in FIG. 3. The two contact surfaces 34, 35 each form a part of these toothed surfaces 37, 38 adjacent to the eye 21.

The connection between the coupling lever 26 and the bearing cover 27 by two form-fitting toothed surfaces 37, 38 enables the use of a high strength, and thus not crackable quenched and tempered steel, with which, compared to a crackable configuration of the coupling element 9, a mass reduction is also possible.

As best illustrated in FIG. 4, the tips of the teeth of the first toothed surface 37 of the coupling lever 26 span a first dividing plane 39 and the tips of the teeth of the second toothed surface 38 of the coupling lever 26 span a second dividing plane 40. The two dividing planes 39, 40 enclose a different inclination angle β both with the separating plane T as well as with the plane E. While the inclination angle β1 between the first dividing plane 39 and the plane E is 20 degrees, the inclination angle β2 between the second dividing plane 40 and the plane E is smaller and is only 15 degrees. As a result, the height H, shown in FIG. 3 by a double arrow, of the bending cross-section between the upper side of the coupling arm 26 and the end of the second toothed surface 38 facing away from the eye 21 and thus the flexural strength of the coupling element 9 can be increased at that location in order to somewhat compensate for the lesser height of the bending cross-section resulting from the inclination or rotation of the separating plane T with respect to the plane E.

As best illustrated in FIG. 4, the first dividing plane 39 extends through the center 36 of the third eye 21 and through the central axis of the crank pin 6 mounted in the third eye 21. Conversely, the second dividing plane 40 or its extension extends approximately through the center of the first eye 19 and has a lateral offset relative to the center 36 of the third eye 21. The two dividing planes 39, 40, while intersecting within the third eye 21, do not intersect in the center between the two bolts 28, 29, but closer to the second bolt 29, wherein the distance of the intersection point of the central longitudinal axis 32 of the first bolt 28 is 3 to 4 times the distance from the longitudinal central axis 33 of the second bolt 29.

Like in the coupling element from DE 10 2011 116 609 A1, in both the first toothed surface 37 and the second toothed surface 38, the two tooth flanks of each tooth have different angular dispositions with respect to the associated first and second dividing planes 39 and 40, respectively.

The invention claimed is:

1. A coupling element for a multi-joint crank drive of an internal combustion engine, comprising:
    a coupling lever having a first eye for attachment of a piston connecting rod of the crank drive, and a second eye for attachment of an articulation connecting rod of the crank drive;
    a bearing cover forming with the coupling lever a third eye for attachment of a crank pin of a crankshaft of the internal combustion engine; and
    two bolts defining parallel longitudinal central axes and threadably connecting the coupling lever and the bearing cover to each other,
    wherein the coupling lever and the bearing cover abut each other at an outer periphery of the third eye at adjacent contact surfaces on both sides of the third eye to define a separating plane which extends between the contact surfaces on both sides of the third eye thereby separating the first eye and the second eye on either side of the separating plane and which also extends through a center of the third eye at an acute angle in relation to a further plane which passes through the center of the third eye and extends in perpendicular relation to the longitudinal central axes of the two bolts,
    wherein a first one of the two bolts is located in an area of the first eye, with the longitudinal central axis of the first one of the two bolts extending through the first eye.

2. The coupling element of claim 1, wherein the separating plane on a side of the first eye is inclined in a direction away from the first eye.

3. The coupling element of claim 1, wherein the coupling lever includes a lift arm which is penetrated by the first eye and configured as a fork arm with two fork limbs.

4. The coupling element of claim 3, wherein one of the two bolts is received in a screw hole in the form of a through-bore sized to open between the fork limbs.

5. The coupling element of claim 1, wherein the coupling lever and the bearing cover form-fittingly abut each other with complementary tooth surfaces on each of both sides of a circumferential edge of the third eye.

6. The coupling element of claim 5, wherein the toothed surfaces of the coupling lever have teeth structured such that their tips define two dividing planes which enclose differently sized angles with the further plane.

7. The coupling element of claim 6, wherein each of the teeth of the toothed surfaces has two tooth flanks which define different angular dispositions in relation to the dividing planes.

8. The coupling element of claim 5, wherein the teeth of the toothed surfaces of the coupling lever are devoid from undercuts in a direction of the longitudinal central axes of the two bolts.

9. A multi-joint crank drive of an internal combustion engine, comprising:
    a piston connecting rod;
    an articulation connecting rod; and
    a plurality of coupling elements, each coupling element comprising a coupling lever having a first eye for attachment of the piston connecting rod, and a second eye for attachment of the articulation connecting rod, a bearing cover forming with the coupling lever a third eye for attachment of a crank pin of a crankshaft of the internal combustion engine and connected to each other at an outer periphery of the third eye, and two bolts defining parallel longitudinal central axes and threadably connecting the coupling lever and the bearing cover to each other, wherein the coupling lever and the bearing cover abut each other at an outer periphery of the third eye at adjacent contact surfaces on both sides of the third eye to define a separating plane which extends between the contact surfaces on both sides of the third eye thereby separating the first eye and the second eye on either side of the separating plane and which also extends through a center of the third eye at an acute angle in relation to a further plane which passes through the center of the third eye and extends in perpendicular relation to the longitudinal central axes of the two bolts, wherein a first one of the two bolts is located in an area of the first eye, with the longitudinal central axis of the first one of the two bolts extending through the first eye.

10. The multi-joint crank drive of claim 9, wherein the separating plane on a side of the first eye is inclined in a direction away from the first eye.

11. The multi-joint crank drive of claim 9, wherein the coupling lever includes a lift arm which is penetrated by the first eye and configured as a fork arm with two fork limbs.

12. The multi-joint crank drive of claim 11, wherein one of the two bolts is received in a screw hole in the form of a through-bore sized to open between the fork limbs.

13. The multi-joint crank drive of claim 9, wherein the coupling lever and the bearing cover form-fittingly abut each other on each of both sides of a circumferential edge of the third eye with complementary tooth surfaces.

14. The multi-joint crank drive of claim 13, wherein the toothed surfaces of the coupling lever have teeth structured such that their tips define two dividing planes which enclose differently sized angles with the further plane.

15. The multi-joint crank drive of claim 14, wherein each of the teeth of the toothed surfaces has two tooth flanks which define different angular dispositions in relation to the dividing planes.

16. The multi-joint crank drive of claim 13, wherein the teeth of the toothed surfaces of the coupling lever are devoid from undercuts in a direction of the longitudinal central axes of the two bolts.

* * * * *